US006416411B1

(12) United States Patent
Tsukahara

(10) Patent No.: US 6,416,411 B1
(45) Date of Patent: Jul. 9, 2002

(54) GAME MACHINE WITH RANDOM SOUND EFFECTS

(75) Inventor: Nakayasu Tsukahara, Koutou-ku (JP)

(73) Assignee: Aruze Corporation, Tokyo (JP)

( * ) Notice: Subject to any disclaimer, the term of this patent is extended or adjusted under 35 U.S.C. 154(b) by 0 days.

(21) Appl. No.: 09/426,181

(22) Filed: Oct. 25, 1999

(30) Foreign Application Priority Data

Oct. 28, 1998 (JP) .......................................... 10-306688

(51) Int. Cl.$^{7}$ ................................................. A63F 13/00

(52) U.S. Cl. ............................. 463/35; 463/16; 463/20; 273/121 B

(58) Field of Search ............................... 463/16–20, 35, 463/42, 30–34, 12, 13; 273/138.1, 138.2, 143 R, 148 R, 121 B, 108, 118–125, 127 R, 129 R, 118 R, 118 A; 446/397

(56) References Cited

U.S. PATENT DOCUMENTS 4,618,150 A 10/1986 Kimura
5,393,061 A * 2/1995 Manship et al. ........ 273/143 R
5,405,142 A * 4/1995 Arad et al. ............. 273/118 R
5,697,843 A * 12/1997 Manship et al. .............. 463/20
5,876,284 A * 3/1999 Acres et al. .................. 463/25
5,908,354 A * 6/1999 Okuniewicz
6,009,458 A * 12/1999 Hawkins et al. ............... 463/1
6,106,393 A * 8/2000 Sunaga et al.
6,106,399 A * 8/2000 Baker et al. .................. 463/42
6,110,041 A * 8/2000 Walker et al.
6,126,165 A * 10/2000 Sakamoto
6,146,273 A * 11/2000 Olsen .......................... 463/27
6,174,233 B1 * 1/2001 Sunaga et al. ................ 463/20
6,217,448 B1 * 4/2001 Olsen .......................... 463/25

FOREIGN PATENT DOCUMENTS

| | | | |
|---|---|---|---|
| DE | 195 42 625 | | 2/1997 |
| EP | 0 720 129 | | 7/1996 |
| JP | 07 236731 | * | 9/1995 |
| JP | 09 253273 | * | 9/1997 |
| JP | 10 272220 | * | 10/1998 |
| WO | 98/14251 | * | 4/1998 |

* cited by examiner

*Primary Examiner*—Michael O'Neill
(74) *Attorney, Agent, or Firm*—Snider & Associates; Ronald R. Snider

(57) ABSTRACT

A gaming machine comprises sound effect pattern storage apparatus storing a plurality of sound effect patterns therein; sound effect pattern selector for selecting one sound effect pattern from the plurality of sound effect patterns stored in the sound effect pattern storage apparatus according to a predetermined condition; and indicator for informing, when the special game occurs, the player of an occurrence of the special game by generating sound effects according to the sound effect pattern selected by the sound effect pattern selector. Consequently, the player can feel a new impression every time a special game occurs, thus being able to fully enjoy the pleasure of gaming. The sound effect pattern storage apparatus and the sound effect pattern selector are constituted by a control unit 23, whereas the indicator is constituted by a speaker 21.

19 Claims, 6 Drawing Sheets

| BB WINNING SOUND | SOUND OUTPUTTING CONDITION | APPORTIONING RATIO |
|---|---|---|
| BB WINNING SOUND 1 | RANDOM NUMBER VALUE IS "0" | 1/8 |
| BB WINNING SOUND 2 | RANDOM NUMBER VALUE IS "1", "4", OR "5" | 3/8 |
| BB WINNING SOUND 3 | RANDOM NUMBER VALUE IS "2", "3", "6", OR "7" | 4/8 |

GAME MACHINE WITH RANDOM SOUND EFFECTS

RELATED APPLICATIONS

This application claims the priority of Japanese Patent Application No. 10-306688 filed on Oct. 28, 1998, which is incorporated herein by reference.

BACKGROUND OF THE INVENTION

1. Field of the Invention

The present invention relates to a gaming machine, such as slot machine, pachinko machine, pachislo gaming machine, or the like; and, in particular, to a gaming machine adapted indicate by sound effects the occurrence of a special game 2. Description of the Prior Art A conventional gaming machine will be explained, by way of example, in regard to a slot machine which is a typical gaming machine.

A conventional slot machine can start a game when a game medal is inserted therein. When a player operates a start switch after a game starting condition is set in order, a plurality of reels rotate, so that a plurality of symbols formed on the surface of each reel move at a high speed. Then, when the player operates the respective stop switches corresponding to the individual reels, the latter stop rotating, whereby a plurality of symbols formed on the reel surfaces are displayed in their stopped state.

Here, in the case where the symbols thus displayed in their stopped state constitute a predetermined combination, then game medals are paid out or a special game known as so-called big bonus game can be played.

This special game allows the player to play a game under a condition more advantageous than that in normal games. For example, the player can acquire a greater number of medals in a big bonus game than in a normal game. Therefore, the player is playing games while expecting occurrences of special games in which a greater number of game medals can be acquired.

Also, for informing the player of the occurrence of a special game, so as to enhance the pleasure of games, LEDs and lamps are blinked, sound effects are generated from a speaker, and so forth.

In the conventional slot machine mentioned above, however, the sound effects generated from the speaker are based on only one kind of sound effect pattern. For example, when a big bonus game occurs, a fanfare indicating the occurrence of the big bonus game is sounded, and so forth.

Meanwhile, with a slot machine in which a special game has once occurred, the player typically keeps playing games while expecting special games to further occur. In this case, if the sound effects (winning sounds) identical to those at the first occurrence of the special game are generated upon the second or later occurrence, the pleasure of gaming may not fully be enjoyed.

Namely, in the case where special games have occurred many times, if the same sound effects are heard every time, the impression of the occurrences of special games will gradually fade away, so that the pleasure of gaming may not be enjoyed in the second and later special games as compared with the first special game.

Also, as with the above-mentioned slot machine, other gaming machines such as pachinko machine, pachislo gaming machine, and the like include those which allow players to play special games more advantageous than normal games, thus having similar problems.

SUMMARY OF THE INVENTION

In view of the above-mentioned circumstances, it is an object of the present invention to provide a gaming machine which, by preparing a plurality of sound effect patterns for indicating occurrences of special games, generates a new impression upon each occurrence of special games, thus allowing its players to fully enjoy the pleasure of gaming.

For achieving the above-mentioned object, the gaming machine of the present invention is a gaming machine which causes a game to be played on condition that a game medium is inserted therein, and allows a player to play a special game more advantageous than a normal game when a predetermined condition is achieved; the gaming machine comprising sound effect pattern storage apparatus for storing a plurality of sound effect patterns therein; sound effect pattern selector for selecting one sound effect pattern from the plurality of sound effect patterns stored in the sound effect pattern storage apparatus according to a predetermined condition; and an indicator for informing, when the special game occurs, the player of an occurrence of the special game by generating sound effects according to the sound effect pattern selected by the sound effect pattern selector.

The sound effect selector may comprise random number generator for generating a random number within a predetermined numerical range, and a sound effect pattern may be selected according to a random number value generated by the random number generator.

The sound effect pattern may be selected by the sound effect pattern selector upon the occurrence of the special game.

The gaming machine may be a slot machine.

The sound effects may comprise a fanfare.

The plurality of sound effect patterns may comprise a plurality of tunes having melodies different from each other.

The plurality of sound effect patterns may comprise an identical melody but differ from each other in at least one of tempo and interval thereof.

Further, the gaming machine of the present invention is a gaming machine which causes a game to be played on condition that a game medium is inserted therein, and allows a player to play a special game more advantageous than a normal game when a predetermined condition is achieved; the gaming machine comprising sound effect pattern storage means storing a plurality of sound effect patterns therein; sound effect pattern selecting means for selecting one sound effect pattern from the plurality of sound effect patterns stored in the sound effect pattern storage means according to a predetermined condition; and indicating means for informing, when the special game occurs, the player of an occurrence of the special game by generating sound effects according to the sound effect pattern selected by the sound effect pattern selecting means.

DESCRIPTION OF THE PREFERRED EMBODIMENTS

In the following, embodiments of the present invention will specifically be explained with reference to the accompanying drawings.

The following embodiments will be explained, by way of an example, in regard to a slot machine as a typical gaming machine. Also, this slot machine is assumed to use game medals as its game medium.

Slot Machine

Figure 1:
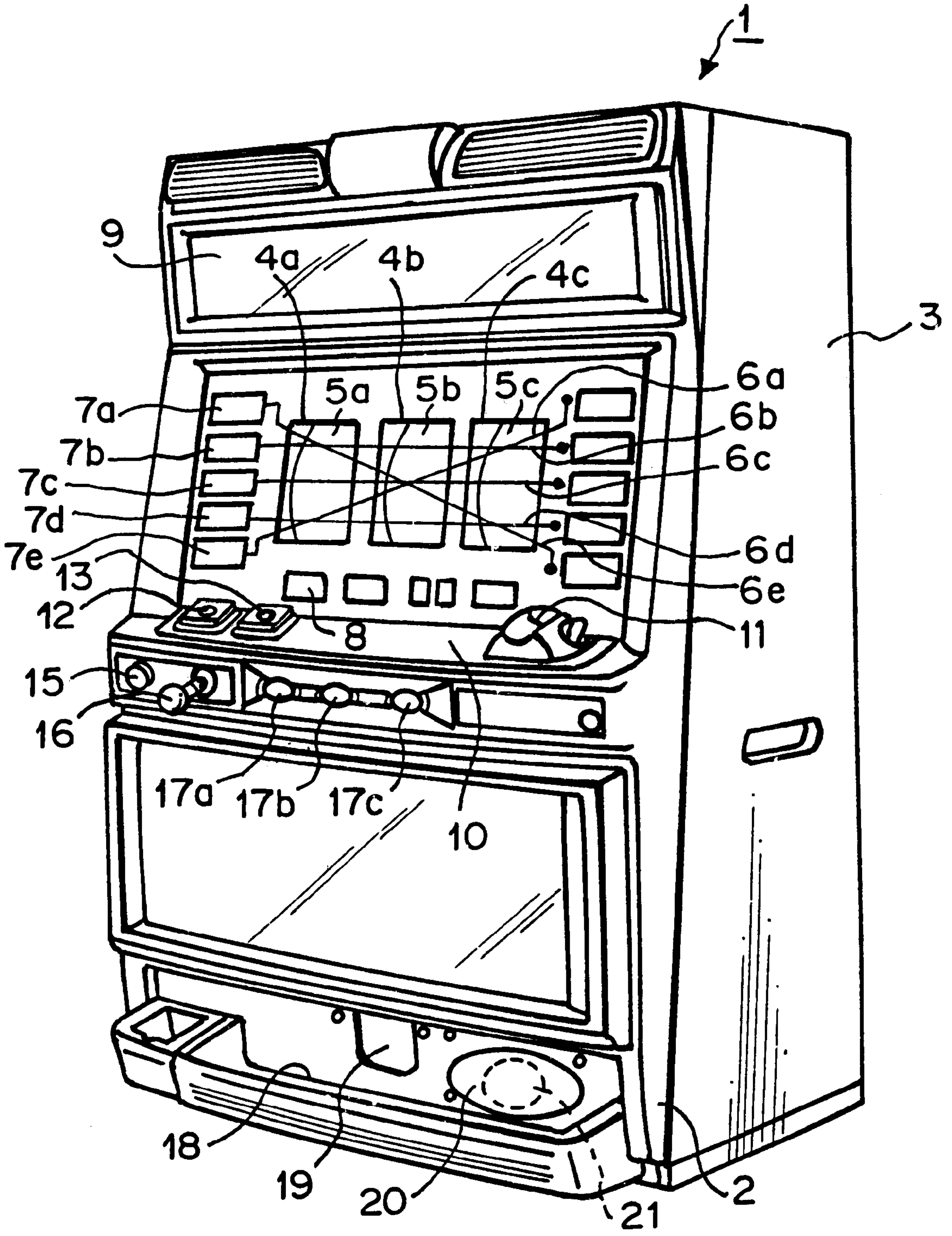
FIG. 1 is a perspective view of a slot machine which is a typical example of the gaming machine in accordance with the present invention.
Figure 2:
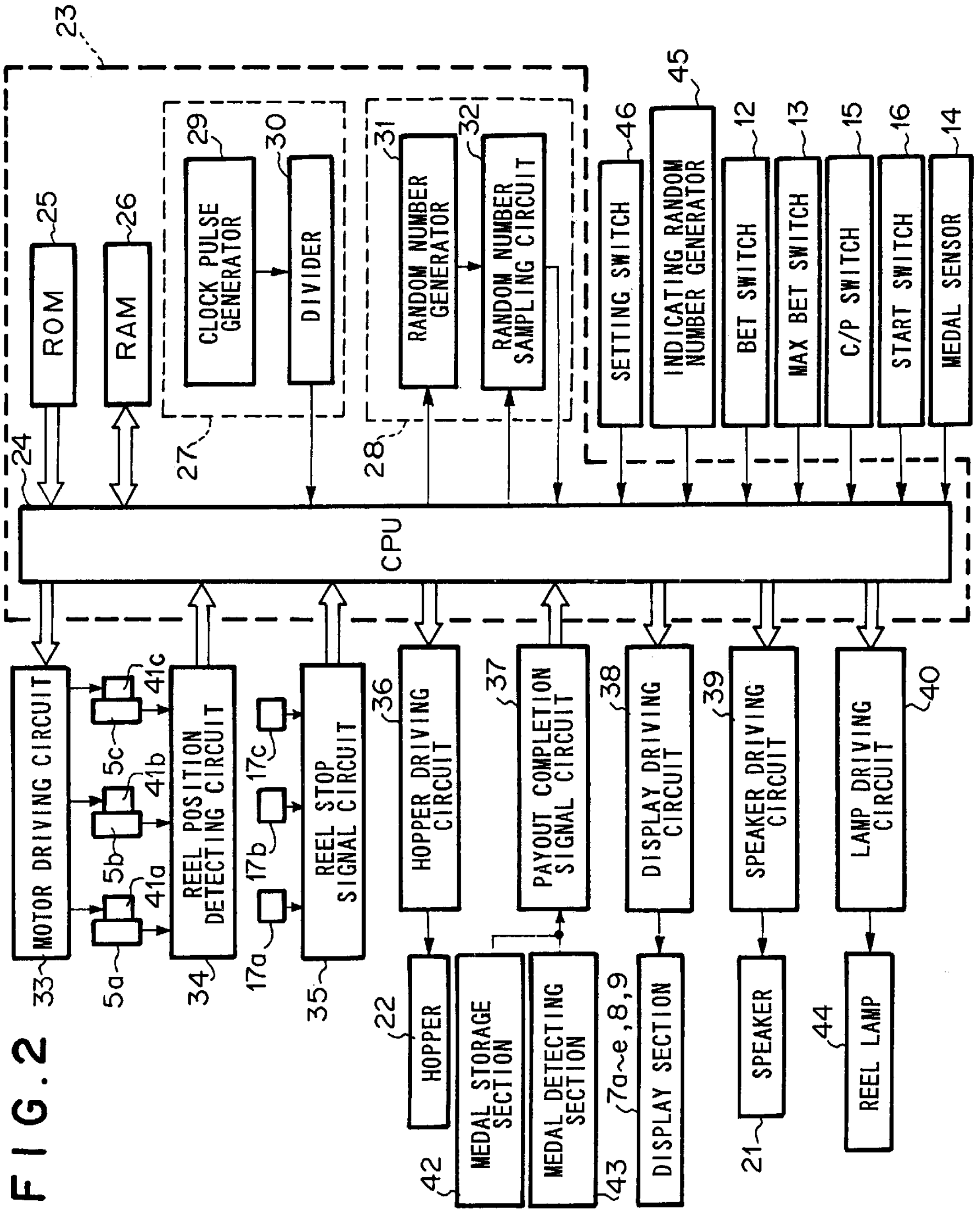
FIG. 2 is a block diagram showing a schematic configuration of the control unit of the slot machine and peripheral devices connected thereto.

FIGS. 1 and 2 show an embodiment of the slot machine in accordance with the present invention. FIG. 1 is a perspective view of this slot machine, whereas FIG. 2 is a block diagram showing the schematic configuration of its control unit and peripheral devices connected thereto.

As shown in FIG. 1, the slot machine 1 in accordance with the present invention has a housing 3 whose front side is provided with a front door 2 which is adapted to open and close. The front door 2 is formed with three display windows 4*a* to 4*c*, aligning left to right, located above near the center of the front face thereof. The respective outer peripheral surfaces of three reels 5*a* to 5*c* disposed within the housing 3 face their corresponding display windows 4*a* to 4*c*. Also, winning line indicators 6*a* to 6*e* for indicating respective effective winning lines are formed across all the display windows 4*a* to 4*c* so as to extend to the peripheries thereof. In the embodiment shown in FIG. 1, five winning line indicators 6*a* to 6*e* in total constituted by three horizontal ones and two oblique ones crossing the horizontal ones are provided. Further, on the left end side of the respective winning line indicators 6*a* to 6*e*, effective line indicator lamps 7*a* to 7*e* for indicating the respective effective winning lines are provided.

Formed in the front door 2 below the display windows 4*a* to 4*c* is a display section such as a credit display section 8 constituted by a seven-segment LED or the like for displaying the number of credited game medals. Also, a dividend display section 9 for displaying the number of game medals to be paid out in reward for a winning is provided in the upper part on the front side of the housing 3.

The front face of the front door 2 below the credit number display section 8 is provided with a shelf 10 which is downwardly inclined toward the front side of the front door 2. This shelf 10 is provided with a medal insertion slot 11 for inserting game medals used for gaming, a bet switch 12 for inserting, one by one, game medals used for gaming within a credited range, and a max bet switch 13 for inserting the game medals used for gaming up to the maximum permissible bet number. Also, a medal sensor 14 (shown in FIG. 2) for detecting game medals is disposed in a medal path (not depicted) communicating with the medal insertion slot 11.

Provided in the front face of the front door 2 below the shelf 10 are a C/P switch 15 for changeover between the credit and the payout of the medals acquired by the player, a start switch 16 for starting rotating each of the reels 5*a* to 5*c* on condition that a game medal is inserted, and three stop switches 17*a* to 17*c* for rotating the respective reels 5*a* to 5*c*.

Further provided in the lower part of the front door 2 is a medal tray 18 for receiving the game medals paid out as a prize, and a medal payout slot 19 facing the medal tray 18. A sound transmission hole 20 is formed on the right side of the medal payout slot 19, whereas a speaker 21 is provided within the housing 3 so as to face the sound transmission hole 20. This speaker 21 functions as an indicating means for informing the player of the occurrence of a special game.

Within the housing 3, the reels 5*a* to 5*c* are rotatably disposed at their respective positions where their outer peripheral surfaces face their corresponding display windows 4*a* to 4*c*, whereas a hopper 22 (shown in FIG. 2) for paying out game medals as a prize is disposed at a position communicating with the medal payout slot 19. Also, a control unit 23 (shown in FIG. 2) for electrically controlling the slot machine 1 is disposed within the housing 3.

A light-transparent reel tape having a plurality of kinds of symbols displayed thereon at predetermined intervals is attached to the outer peripheral surface of each of the reels 5*a* to 5*c*. The kinds of symbols include "7," "BAR," "watermelon," "bell," "plum," "cherry," "orange," and the like, for example, and each of the reels 5*a* to 5*c* displays 21 symbols. Here, the kinds of symbols and the number of symbols displayed in each of the reels 5*a* to 5*c* can be changed as appropriate.

Disposed inside each of the reels 5*a* to 5*c* are three reel lamps 44 (shown in FIG. 2) in a vertical row for illuminating from inside the respective reel 5*a* to 5*c* in a transmitting manner the symbols seen through their corresponding display windows 4*a* to 4*c*. As the reel lamps 44 are lit, each of the reels 5*a* to 5*c* can be illuminated from inside, whereby the symbols displayed in their stopped state on effective winning lines can be highlighted.

Also disposed within the housing 3 is a setting switch 46 (shown in FIG. 2) for setting the probability of occurrence of so-called big bonus games.

Though not depicted in detail, this setting switch 46 is constituted by a key type setting switch in synchronization with a power switch, and a reset switch or the like, for example.

The set values of probability of occurrence of big bonus games can be set to six stages of "1" to "6," for example, while the individual set values correspond to six stages of probability of occurrence within the range of 1/240 to 1/300. As the control unit 23 controls the reels 5*a* to 5*c* so as to make them rotate and stop according to thus set values, big bonus games are generated.

Game in Slot Machine

To begin with, for playing a game with the slot machine 1, game medals are actually inserted into the medal insertion slot 11, or the bet switch 12 or the max bet switch 13 is operated such that game medals used for gaming are inserted within the credit range. Here, effective winning lines are determined according to the number of inserted game medals, and their corresponding effective line indicator lamps 7*a* to 7*e* are lit. For example, one horizontal line in the middle becomes effective when one game medal is inserted; three horizontal lines in the upper, middle, and lower parts become effective when two game medals are inserted; and five lines in total consisting of three horizontal lines in the upper, middle, and lower parts and two oblique lines become effective when three game medals, which constitute the maximum permissible bet number, are inserted.

Subsequently, when the player operates the start switch 16, all the reels 5*a* to 5*c* start rotating at once, whereby a plurality of kinds of symbols formed on the respective outer peripheral surfaces of the reels 5*a* to 5*c* are displayed while vertically moving within their corresponding display windows 4*a* to 4*c*. When the rotation of each reel 5*a* to 5*c* reaches a predetermined speed, its corresponding stop switch 17*a* to 17*c* is made effective. Then, as the player operates each stop switch 17*a* to 17*c*, its corresponding reel 5*a* to 5*c* stops rotating.

Here, in the case where the combination of the symbols displayed on an effective winning line in their stopped state constitutes a predetermined winning mode, the number of game medals corresponding to this winning mode are paid out as a prize or added as a credit.

Predetermined winning modes include those of normal games and those of special games more advantageous than the normal games to the player. Further, the winning modes of special games include those of so-called big bonus games and those of so-called regular bonus games.

The winning modes of normal games include, for example, the cases where the combination of the symbols displayed on an effective winning line in their stopped state is constituted by "bell," "bell," and "bell; " where the combination is constituted by "orange," "orange," and "orange"; where "cherry" is displayed in its stopped state in the left display window; and the like, whereby a predetermined number of, e.g., two to eight, game medals are paid out.

In addition, winning modes for replay may be set, so as to allow the player to play a game again under the same condition as that of the last game.

Big Bonus Game

The winning modes of big bonus games are concerned with games started on condition that the combination of symbols displayed on an effective winning line in their stopped state is constituted by "7," "7," and "7," for example, whereby a predetermined number of, e.g., 15, game medals are paid out, while big bonus games which are more advantageous than normal games to the player are allowed to be played.

In a big bonus game, the so-called regular bonus game can be played three times, and a greater number of game medals can be acquired as compared with a normal game.

Regular Bonus Game

The winning modes of regular bonus games are concerned with games started on condition that the combination of symbols displayed on an effective winning line in their stopped state is constituted by "BAR," "BAR," and "BAR," for example, whereby a predetermined number of, e.g., 15, game medals are paid out, while regular bonus games are allowed to be played.

In a regular bonus game, a predetermined number of game medals are inserted, and the start switch 16 is operated, so as to start rotating the reels 5*a* to 5*c*. Thereafter, the stop switches 17*a* to 17*c* are operated, so as to stop rotating their corresponding reels 5*a* to 5*c*.

Then, if the symbols displayed on an effective line in their stopped state constitute a predetermined combination, a predetermined number of, e.g., 15, game medals will be paid out.

In this regular bonus game, the maximum number of games and the maximum number of winning are limited. For example, when the above-mentioned game is played 12 times, i.e., the maximum number of games is reached, or the above-mentioned winning is attained 8 times, i.e., the maximum number of winning is reached, then the regular bonus game is terminated.

The above-mentioned series of gaming actions is controlled by the control unit 23 disposed within the housing 3.

Control Unit

The control unit 23 will be explained with reference to FIG. 2.

As shown in FIG. 2, the control unit 23 comprises a CPU 24, a ROM 25, a RAM 26, a clock circuit 27 for generating an operating clock signal for the CPU 24, a probability setting section 28 for setting the probability of occurrence of big bonus games, and a sound effect selecting random number generator 45 for generating a random number used for selecting sound effects.

The ROM 25 stores therein not only the procedure of processing in games of the slot machine 1 as a sequence program but also data such as a winning probability table and the like for determining the probability of sampling and the like. As the CPU 24 and the like operate according to the sequence program, games in the slot machine 1 are controlled.

Thus, the ROM 25 constitutes a sound effect pattern storage means storing a plurality of sound effect patterns therein, whereas the control unit 23 comprising the CPU 24 and the like constitutes a sound effect pattern selecting means for selecting one sound effect pattern from the plurality of sound effect patterns stored in the sound effect pattern storage means.

The clock circuit 27 comprises a clock pulse generator 29 for generating a reference clock at a predetermined frequency, and a divider 30 for generating an operating clock signal for the CPU 24 by dividing the reference clock signal.

The probability setting section 28 comprises a random number generator 31 for generating random numbers within a predetermined range under the control of the CPU 24, and a random number sampling circuit 32 for extracting a given random number from the random numbers generated in the random number generator 31 and transmitting thus extracted random number to the CPU 24. Also, the setting switch 46 for setting the probability of occurrence of big bonus games is connected to the probability setting section 28.

The sound effect selecting random number generator 45 comprises, for example, an 8-bit refresh register and is adapted to generate 128 random numbers ranging from "0" to "127" when all the bits of the refresh register are used. This sound effect selecting random number generator 45 constitutes a random number generating means.

Connected to a plurality of I/O ports provided with the CPU 24 are the bet switch 12, the max bet switch 13, the C/P switch 15, the start switch 16, the medal sensor 14, a motor driving circuit 33, a reel position detecting circuit 34, a reel stop signal circuit 35, a hopper driving circuit 36, a payout completion signal circuit 37, a display driving circuit 38, a speaker driving circuit 39, and a lamp driving circuit 40.

In the following, the individual circuits mentioned above will be explained in detail.

Connected to the motor driving circuit 33 are stepping motors 41*a* to 41*c* for driving the respective reels 5*a* to 5*c* to rotate. As driving pulses are supplied or stopped being supplied to the individual stepping motors 41*a* to 41*c* under the control of the CPU 24, the respective reels 5*a* to 5*c* are caused to start or stop rotating.

The reel position detecting circuit 34 is provided with a position detecting sensor comprising a photosensor or the like for detecting the rotating position of of the reels 5*a* to 5*c*, so that the position detection signals concerning the reels 5*a* to 5*c* detected by the position detecting sensor are transmitted to the CPU 24.

Connected to the reel stop signal circuit 35 are stop switches 17*a* to 17*c*. As the player operates the stop switches 17*a* to 17*c*, the operation is detected, and the resulting stop switch detection signal is transmitted to the CPU 24.

Connected to the hopper driving circuit 36 is the hopper 22 for storing game medals.

Connected to the payout completion signal circuit 37 are a medal storage section 42 and a medal detecting section 43. The medal storage section 42 is a section for storing the game medals inserted from the medal insertion slot 11 or the game medals to be paid out as a prize, and is adapted to store the game medals until they reach a predetermined maximum permissible storage number. The maximum permissible storage number is 50, for example, so that up to 50 game medals are stored, whereas the 51st and later game medals are actually paid out from the hopper 22 to the medal tray 18. The actually paid-out medals are counted by the medal detecting section 43 at the time when being paid out from the hopper 22 to the medal tray 18. In the operation of paying out game medals at the time of winning, if the sum value stored in the medal storage section 42 in an adding fashion or the counted value in the medal detecting section 43 reaches a predetermined payout number, then a payout completion signal is transmitted from the payout completion signal circuit 37 to the CPU 24.

Connected to the display driving circuit 38 are the effective line indicator lamps 7*a* to 7*e*, the credit number display section 8, and the dividend display section 9. Under the control of the CPU 24, the effective line indicator lamps 7*a* to 7*e* are lit, and displaying is effected in each of the display sections 8, 9. Also, the number of game medals stored in the medal storage section 42 is displayed in the credit number display section 8.

Connected to the speaker driving circuit 39 is the speaker 21 for generating sound effects and the like. Connected to the lamp driving circuit 40 are the reel 44 for illuminating from inside the reels 5*a* to 5*c* in a transmitting fashion the symbols seen through the display windows 4*a* to 4*c*.

Control Processing of Slot Machine

In the following, the control processing of the slot machine 1 carried out by the control unit 23 will be explained with emphasis on the process of indicating the occurrence of a special game in particular.

Figures 3, 4:
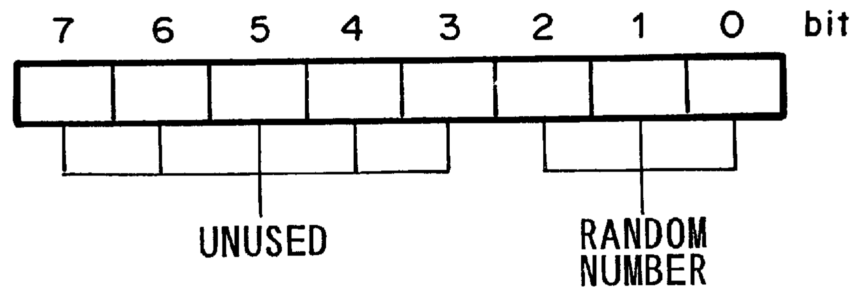
FIG. 3 is a conceptual view of a refresh register for generating random numbers used for selecting sound effects.
FIG. 4 is an explanatory view of outputting conditions for winning sounds of a big bonus game.
Figure 5:
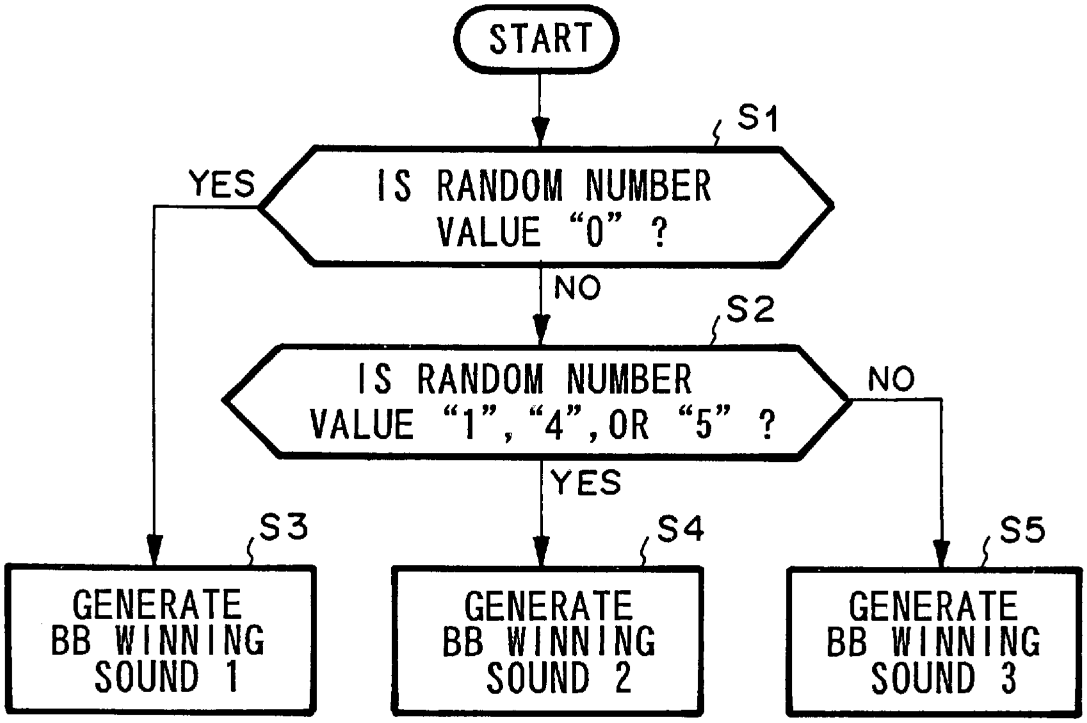
FIG. 5 is a flowchart for explaining how to apportion the winning sounds of the big bonus game.
Figure 6:
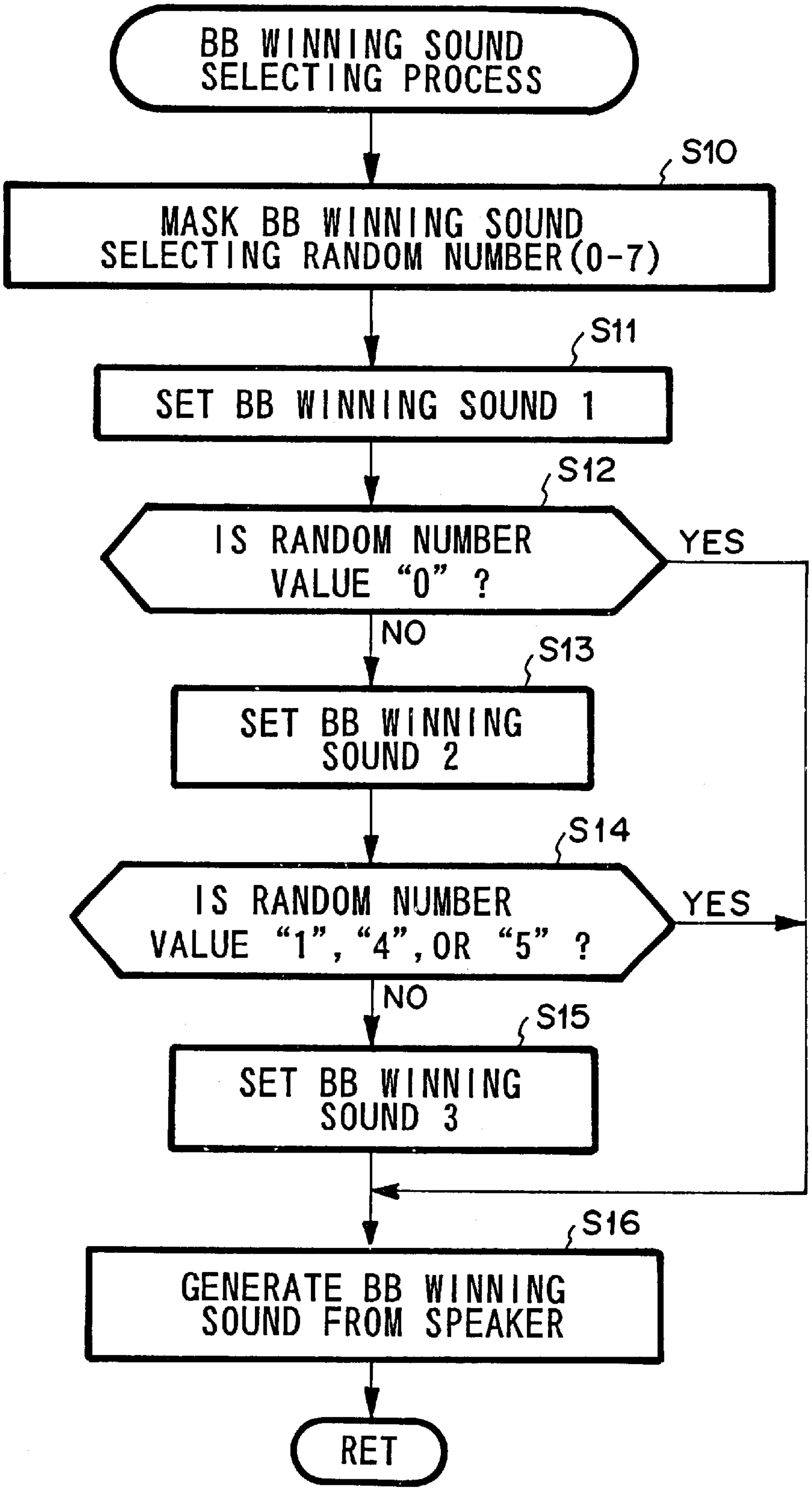
FIG. 6 is a flowchart showing the procedure of a process of selecting the winning sounds of the big bonus game.
Figure 7:
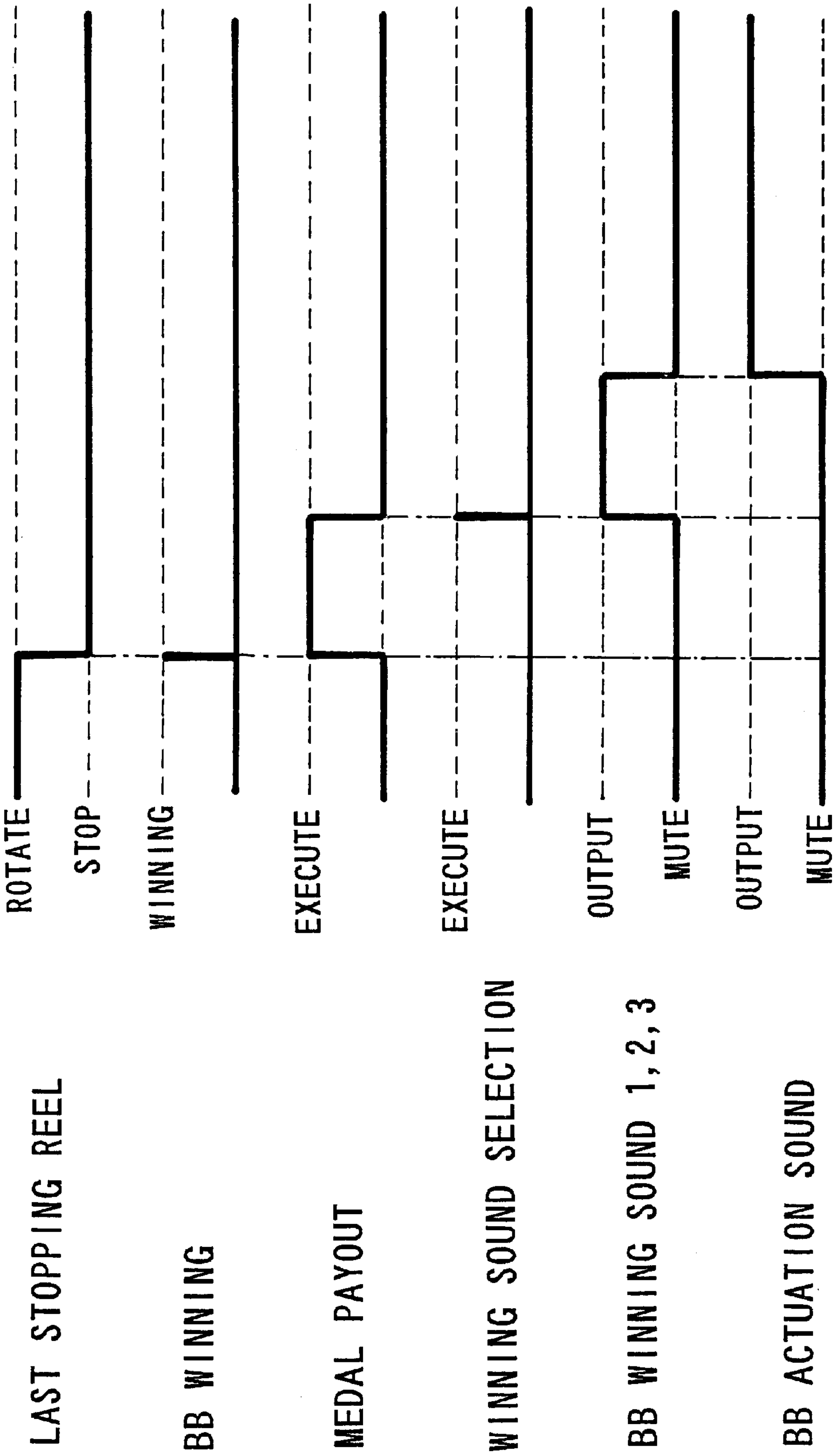
FIG. 7 is a timing chart showing a timing at which the wining sounds of the big bonus game are generated.

FIG. 3 is a conceptual view of a refresh register, FIG. 4 is an explanatory view of outputting conditions for winning sounds of a big bonus game, and FIG. 5 is a flowchart for explaining how to apportion the winning sounds of the big bonus game. Also, FIG. 6 is a flowchart showing the procedure of a process of selecting the winning sounds of the big bonus game, and FIG. 7 is a timing chart showing a timing at which the wining sounds of the big bonus game are generated.

In each drawing, the big bonus games are abridged as "BB."

The indicating random number generator 45 for generating the random numbers used for selecting the winning sounds is constituted by a refresh register having 8 bits from "0" to "7" as shown in FIG. 3, from which 3 bits from "0" to "2" are used for generating 8 random numbers from "0" to "7" to be employed.

The random number sampling is updated, for example, at every interrupt processing and idling processing at intervals of 225 $\mu$m (added "1" by "1").

While thus generated random numbers are used for sampling, the results of sampling and the outputting conditions for the winning sounds of the big bonus game have a relationship therebetween as shown in FIG. 4.

Namely, as shown in FIG. 4, the winning sounds indicating the occurrence of a big bonus game are constituted by three kinds, i.e., winning sounds 1 to 3. When the sampled random number value is "0," then the winning sound 1 is selected.

When the sampled random number value is "1," "4," or "5," then the winning sound 2 is selected. When the sampled random number value is "2," "3," "6," or "7," then the winning sound 3 is selected. Consequently, the probabilities of occurrence of the winning sounds 1, 2, and 3 are ⅛, ⅜, and 4/8, respectively.

Without being restricted to those mentioned above, the random numbers generated in the indicating random number generator 45 and sound outputting conditions can appropriately be changed according to the number of winning sounds and the like.

In the process of selecting the winning sounds, as shown in FIG. 5, it is initially determined if the sampled random number value is "0" or not (S1). Here, if the sampled random number value is "0," then the winning sound 1 is generated from the speaker 21 (S3).

If the sampled random number value is other than "0," then it is further determined if this random number value is any of "1," "4," or "5" (S2). Here, if the sampled random number value is one of "1," "4," and "5," then the winning sound 2 is generated from the speaker 21 (S4).

If the sampled random number value is none of "1," "4," and "5," i.e., one of "2," 3," "6," and "7," then the winning sound 3 is generated from the speaker 21 (S5).

As the above-mentioned determination processing operations are carried out, the winning sounds 1 to 3 are selected, whereby three different kinds of winning sounds are generated from the speaker 21.

In the following, with reference to FIG. 6, the process of selecting the winning sounds of a big bonus game will be explained further in detail.

In the slot machine 1, when game medals are inserted into the medal insertion slot 11, or when the bet switch 12 or the max bet switch 13 is operated so that game medals are received within a credit range, a game can be started. Here, as the start switch 16 is operated, all the reels 5*a* to 5*c* start rotating, whereby a plurality of symbols are displayed within the display windows 4*a* to 4*c* as being moved at a high speed.

After the individual reels 5*a* to 5*c* have reached a predetermined rotating speed, the stop switches 17*a* to 17*c* are operated, so as to stop rotating their corresponding reels 5*a* to 5*c*. Thereafter, it is determined whether a predetermined winning mode is constructed or not, and it is also determined whether a winning mode of a big bonus game is constructed or not.

If a winning mode of a big bonus game is achieved here, then the process of selecting the winning sounds of the big bonus game is carried out.

First, in this process of selecting the winning sounds of a big bonus game, as shown in FIG. 6, the random number for selecting the winning sounds of a big bonus is masked (S10), and the winning sound 1 is set (S11).

Subsequently, it is determined whether the sampled random number value is "0" or not (S12). If the sampled random number value is "0," then the winning sound 1 is generated from the speaker 21 (S16).

If the sampled random number value is other than "0," then the winning sound 2 is set (S13), and it is determined whether this random number value is any of "1," "4," and"5" (S14). If the sampled random number value is one of "1," "4," and "5" here, then the winning sound 2 is generated from the speaker 21 (S16).

If the sampled random number value is none of "1," "4," and "5," i.e., one of "2," 3," "6," and "7," then the winning sound 3 is set (S13), and the winning sound 3 is generated from the speaker 21 (S16).

Though not depicted, when the combination of the symbols displayed on an effective winning line in their stopped state constitutes a winning mode, the number of medals corresponding to this winning mode are paid out, and then the process shifts to the controlling process for the next game.

In the following, with reference to FIG. 7, a timing at which the sound effects (winning sounds) of a big bonus game are generated will be explained.

As shown in FIG. 7, at the timing when the last stopping reel (which is usually the right reel 5*c*) among the three reels 5*a* to 5*c* stops rotating, it is determined whether a big bonus game is won or not. If a winning mode of a big bonus game is attained, then a predetermined number of game medals are paid out.

At the timing when the payout of the game medals is completed, a winning sound is selected, and thus selected winning sound 1 to 3 is generated from the speaker 21. Further, at the timing when the generation of the winning sound is completed, actuation sounds of the big bonus game are generated from the speaker 21.

Though three kinds of winning sounds are generated in the above-mentioned embodiment, two kinds or four or more kinds of winning sounds may be generated as well. Also, the plurality of kinds of winning sounds may be of any kind as long as they are distinguishable from each other. For example, the plurality of kinds of winning sounds may be constituted by a plurality of tunes having different melodies or the same melody with different tempos and intervals.

Though the above-mentioned individual embodiments are explained, by way of example, in regard to the slot machine 1 as a typical gaming machine, the present invention is also applicable to other gaming machines such as pachinko machine, pachislo gaming machine, and the like, for example.

When a special game occurs, the gaming machine of the present invention selects one sound effect pattern from a plurality of prestored sound effect patterns, and generates sound effects based on the selected sound effect pattern, thereby informing a player of the occurrence of the special game.

Consequently, there is a possibility of sound effects with different sound effect patterns occurring upon each occurrence of special games. Hence, the player can feel a new impression every time a special game occurs, thus being able to fully enjoy the pleasure of gaming without monotonously playing games.

Also, the sound effect patterns are selected according to a random number value generated within a predetermined numerical value range.

As a consequence, when a special game occurs, it is unpredictable which sound effect pattern is used as a basis for generating the sound effects. Thus, unpredictability is yielded in games, whereby the pleasure of gaming can further be enhanced.

Also, the sound effect pattern can be selected upon the occurrence of a special game. In this case, as the selecting of a sound effect pattern is always carried out for each special game, there would be a higher possibility of special games generating respective sound effects different from each other, whereby the pleasure of gaming can further be enhanced.

What is claimed is:

1. A gaming machine which causes a game to be played on condition that a game medium is inserted therein, and allows a player to play a special game in which gaming mode is changed so as to be more advantageous for a player than a normal game when a predetermined condition is achieved, said gaming machine comprising:

sound effect pattern storage apparatus for storing a plurality of sound effect patterns therein;

sound effect pattern selector for randomly selecting one sound effect pattern from the plurality of sound effect patterns stored in said sound effect pattern storage apparatus when the predetermined condition is achieved and;

an indicator for informing, when said special game occurs, said player of an occurrence of said special game by generating sound effects according to the sound effect pattern selected by said sound effect pattern selector, wherein said sound effect pattern selector comprises;

random number generator for generating a random number within a predetermined numerical range; and wherein a sound effect pattern is selected according to a random number value generated by said random number generator.

2. A gaming machine according to claim 1, wherein said sound effect pattern is selected by the sound pattern selector upon the occurrence of the special game.

3. A gaming machine according to claim 1, wherein said gaming machine is a slot machine.

4. A gaming machine according to claim 1, wherein said sound effects comprise a fanfare.

5. A gaming machine according to claim 1, wherein said plurality of sound effect patterns comprise a plurality of tunes having melodies different from each other.

6. A gaming machine according to claim 1, wherein said plurality of sound effect patterns comprise an identical melody but differ from each other in at least one of tempo and interval thereof.

7. A gaming machine according to claim 1, wherein when the payout of the fame medals is completed, the selected sound effect is generated.

8. A gaming machine according to claim 1, wherein when the generation of the sound effect is completed, actuation sounds of the big bonus game are generated.

9. A gaming machine which causes a game to be played on condition that a game medium is inserted therein, and allows a player to play a special game in which gaming mode is changed so as to be more advantageous for a player than a normal game when a predetermined condition is achieved, said gaming machine comprising:

sound effect pattern storage means for storing a plurality of sound effect patterns therein;

sound effect pattern selector means for randomly selecting one sound effect pattern from the plurality of sound effect patterns stored in said sound effect pattern storage means when the predetermined condition is achieved and;

an indicator means for informing, when said special game occurs, said player of an occurrence of said special game by generating sound effects according to the sound effect pattern selected by said sound effect pattern selector means, wherein said sound effect selector means comprises:

random number generator means for generating a random number within a predetermined numerical range; and wherein a sound effect pattern is selected according to a random number value generated by said random number generator means.

10. A gaming machine which causes a game to be played on condition that a game medium is inserted therein, and allows a player to play a special game in which gaming mode is changed so as to be more advantageous for a player than a normal game when a predetermined condition is achieved, said gaming machine comprising:

sound effect pattern storage apparatus for storing a plurality of sound effect patterns therein;

sound effect pattern selector for randomly selecting one sound effect pattern from the plurality of sound effect patterns stored in said sound effect pattern storage apparatus when the predetermined condition is achieved and;

an indicator for informing, when said special game occurs, said player of an occurrence of said special game by generating sound effects according to the sound effect pattern selected by said sound effect pattern selector, wherein a probability of occurrence of a sound effect is different from a probability of occurrence of another sound effect.

11. A gaming machine according to claim 10, wherein said sound effect pattern is selected by the sound pattern selector upon the occurrence of the special game.

12. A gaming machine according to claim 10, wherein said gaming machine is a slot machine.

13. A gaming machine according to claim 10, wherein said sound effects comprise a fanfare.

14. A gaming machine according to claim 10, wherein said plurality of sound effect patterns comprise a plurality of tunes having melodies different from each other.

15. A gaming machine according to claim 10, wherein said plurality of sound effect patterns comprise an identical melody, but differ from each other in at least one of tempo and interval thereof.

16. A gaming machine according to claim 10, wherein when the payout of the game medals is completed, the selected sound effect is generated.

17. A gaming machine according to claim 10, wherein when the generation of the sound effect is completed, actuation sound of the big bonus game are generated.

18. A gaming machine which causes a game to be played on condition that a game medium is inserted therein, and allows a player to play a special game in which gaming mode is changed so as to be more advantageous for a player than a normal game when a predetermined condition is achieved, said gaming machine comprising:

sound effect pattern storage means for storing a plurality of sound effect patterns therein;

sound effect pattern selector means for randomly selecting one sound effect pattern from the plurality of sound effect patterns stored in said sound effect pattern storage means when the predetermined condition is achieved and;

an indicator for informing, when said special game occurs, said player of an occurrence of said special game by generating sound effects according to the sound effect pattern selected by said sound effect pattern selector means, wherein a probability of occurrence of a sound effect is different from a probability of occurrence of another sound effect.

19. A gaming machine according to claim 1, wherein said random number generator comprises a refresh register.

* * * * *

UNITED STATES PATENT AND TRADEMARK OFFICE

CERTIFICATE OF CORRECTION

PATENT NO. : 6,416,411 B1
DATED : July 9, 2002
INVENTOR(S) : Nakayasu Tsukahara

It is certified that error appears in the above-identified patent and that said Letters Patent is hereby corrected as shown below:

Column 10,
Line 35, delete the word "fame" and substitute therefore -- game --.

Signed and Sealed this

Twenty-first Day of January, 2003

JAMES E. ROGAN
*Director of the United States Patent and Trademark Office*